US012521646B2

(12) United States Patent
Bae et al.

(10) Patent No.: US 12,521,646 B2
(45) Date of Patent: Jan. 13, 2026

(54) ABSORBENT BELT AND OIL SKIMMER INCLUDING THE SAME

(71) Applicants: HYUNDAI MOTOR COMPANY, Seoul (KR); KIA CORPORATION, Seoul (KR); INDUSTRIAL COOPERATION FOUNDATION OF CHONBUK NATIONAL UNIVERSITY

(72) Inventors: Sungmin Bae, Jeonju-si (KR); Cheol Sang Kim, Jeonju-si (KR); Chan Hee Park, Jeonju-si (KR); Sung Won Ko, Jeonju-si (KR); Jun Hee Lee, Jeonju-si (KR); Joon Yeon Moon, Jeonju-si (KR)

(73) Assignees: HYUNDAI MOTOR COMPANY, Seoul (KR); KIA CORPORATION, Seoul (KR); INDUSTRIAL COOPERATION FOUNDATION OF CHONBUK NATIONAL UNIVERSITY, Jeonju-si (KR)

( * ) Notice: Subject to any disclaimer, the term of this patent is extended or adjusted under 35 U.S.C. 154(b) by 538 days.

(21) Appl. No.: 17/989,465

(22) Filed: Nov. 17, 2022

(65) Prior Publication Data

US 2023/0249102 A1     Aug. 10, 2023

(30) Foreign Application Priority Data

Feb. 7, 2022 (KR) .................. 10-2022-0015415

(51) Int. Cl.
*B01D 15/02* (2006.01)
*B01J 20/26* (2006.01)
(Continued)

(52) U.S. Cl.
CPC ............ *B01D 15/02* (2013.01); *B01J 20/262* (2013.01); *B01J 20/28045* (2013.01);
(Continued)

(58) Field of Classification Search
None
See application file for complete search history.

(56) References Cited

U.S. PATENT DOCUMENTS

| 3,036,046 A | * | 5/1962 | Glickman | .............. C08G 69/24 |
| | | | | 528/312 |
| 3,992,292 A | * | 11/1976 | Grimes | .............. B01D 17/0214 |
| | | | | 210/671 |

(Continued)

FOREIGN PATENT DOCUMENTS

| CN | 108586795 A | * | 9/2018 | ......... B01D 17/0202 |
| CN | 208649043 U | * | 3/2019 | |

(Continued)

OTHER PUBLICATIONS

Machine translation of CN-208649043-U (Year: 2025).*
Machine translation of KR-20170114089-A (Year: 2025).*
Machine translation of KR-20200142823-A (Year: 2025).*
Machine translation of CN-108586795-A (Year: 2025).*

*Primary Examiner* — Bobby Ramdhanie
(74) *Attorney, Agent, or Firm* — MCDONNELL BOEHNEN HULBERT & BERGHOFF LLP

(57) ABSTRACT

An absorbent belt according to an embodiment is for absorbing an oil contained in a cleaning liquid, and the absorbent belt includes a sponge member coated with dopamine (DA) formed by immersing a sponge in a solution mixed with the dopamine in a preset range of 1 g/L or more and 16 g/L or less.

11 Claims, 5 Drawing Sheets

(51) Int. Cl.
  *B01J 20/28*    (2006.01)
  *B01J 20/32*    (2006.01)
  *C02F 1/28*     (2023.01)
  *C02F 101/32*   (2006.01)
  *C02F 103/44*   (2006.01)

(52) U.S. Cl.
  CPC ....... *B01J 20/3212* (2013.01); *B01J 20/3214* (2013.01); *B01J 20/3246* (2013.01); *C02F 1/285* (2013.01); *C02F 1/288* (2013.01); *C02F 2101/32* (2013.01); *C02F 2103/44* (2013.01)

(56) References Cited

U.S. PATENT DOCUMENTS

| | | | | | |
|---|---|---|---|---|---|
| 4,582,604 | A | * | 4/1986 | Bashaw | E02B 15/101 |
| | | | | | 210/396 |
| 4,876,011 | A | * | 10/1989 | Betts | E02B 15/104 |
| | | | | | 210/923 |
| 5,164,083 | A | * | 11/1992 | Ahrendt | E02B 15/104 |
| | | | | | 210/776 |
| 5,259,958 | A | * | 11/1993 | Bronnec | B01D 17/0214 |
| | | | | | 585/920 |
| 2021/0054172 | A1 | * | 2/2021 | Liu | C08J 5/18 |

FOREIGN PATENT DOCUMENTS

| | | | |
|---|---|---|---|
| KR | 20170114089 A | * | 10/2017 |
| KR | 20200142823 A | * | 12/2020 |

* cited by examiner

ABSORBENT BELT AND OIL SKIMMER INCLUDING THE SAME

CROSS REFERENCE TO RELATED APPLICATIONS

This application claims priority to and the benefit of Korean Patent Application No. 10-2022-0015415 filed in the Korean Intellectual Property Office on Feb. 7, 2022, the entire contents of which are incorporated herein by reference.

BACKGROUND

(a) Field

The present disclosure relates to an absorbent belt and an oil skimmer including the same. More particularly, the present disclosure relates to an absorbent belt capable of effectively separating oil contained in cleaning liquid by employing a lipophilic absorbent belt, and an oil skimmer including the same.

(b) Description of the Related Art

In general, water, oil, and sludge are mixed in the wastewater of cleaning liquid that has been used to clean vehicle component parts.

When the wastewater of the cleaning liquid is discharged to the wastewater treatment plant without going through a pretreatment process, oil may be accumulated in the sewage pipe and the pump thereby closing the conduit, or other mechanical failures may occur. Thus, the pretreatment process is required for the wastewater, prior to being discharged.

As a method for separating oil and water from the wastewater in which water, oil, and sludge are mixed, a gravity separation method, a hydraulic separation method, a filter separation method, and the like are mainly used.

The gravity separation method is a method of removing oil by skimming the oil with an oil skimmer after floating the oil on top of the wastewater. The hydraulic separation method is a method of separating oil and water by centrifugal force and gravity while forming a specific flow pattern such as a vortex in a limited space. The filter separation method is a method of filtering oil and passing water using a filter cloth such as a non-woven fabric.

At this time, the oil skimmer may be formed in a belt type that includes a main body having a built-in driving motor, a cradle in which a drive roller and an idle roller are installed, a belt connected between the drive roller and the idle roller to be rotated by the operation of the driving motor, and a scraper for removing oil from the belt.

A conventional oil skimmer adsorbs oil floating on the water level on the surface of the belt and transfers it to the scraper.

However, since the conventional oil skimmer scrapes the surface of the belt on which the oil is adsorbed, the surface of the belt is often worn or broken.

In addition, although the conventional oil skimmer attempts to separate only the oil attached to the belt, and it is difficult to fully separate the oil from the water. Therefore, conventionally, the oil is recollected in a state still being mixed with water.

The above information disclosed in this Background section is only for enhancement of understanding of the background of the disclosure, and therefore it may contain information that does not form the prior art that is already known in this country to a person of ordinary skill in the art.

SUMMARY

The present disclosure provides an absorbent belt and an oil skimmer including the same that are capable of, by applying a lipophilic absorbent belt, selectively separating the oil in water-soluble cleaning liquid, thereby improving the performance of separating oil from the used cleaning liquid.

An absorbent belt according to an embodiment is for absorbing an oil contained in a cleaning liquid, and the absorbent belt includes a sponge member coated with dopamine (DA) formed by immersing a sponge in a solution mixed with the dopamine in a preset range of 1 g/L or more and 16 g/L or less.

The absorbent belt may further include a urethane belt having a closed cross-section, where the sponge member is adhered to an exterior surface of the urethane belt.

The sponge member may be formed by immersing the sponge of a polyurethane material in a solution of pH 8 or more and pH 8.5 or less, mixing the dopamine of a preset amount into the solution and agitating the solution to coat the sponge with the dopamine, repeatedly cleaning the sponge coated with the dopamine, and then drying the sponge.

The absorbent belt may be lipophilic to absorb an oil within the cleaning liquid.

An oil skimmer according to an embodiment includes a cleaning liquid storage tank configured to store a cleaning liquid having been used in a vehicle processing line, an absorbent belt vertically disposed by a cradle disposed inside the cleaning liquid storage tank, of which a preset range of a lower end portion is immersed in the cleaning liquid, and coated with a composite material to absorb an oil contained in the cleaning liquid while rotating, a driving portion disposed at vertical both ends of the absorbent belt and mounted on the cradle, a squeeze roller disposed at a preset position with respect to the absorbent belt, mounted on the cradle, and configured to separate an oil absorbed in the absorbent belt by squeezing the absorbent belt, and a recollected oil holder disposed below the squeeze roller and configured to store the oil separated from the absorbent belt.

The absorbent belt may include a urethane belt having a closed cross-section, and a sponge member coated with the composite material and adhered to an exterior surface of an urethane belt.

The sponge member may be formed by immersing a sponge of a polyurethane material in a solution of pH 8 or more and pH 8.5 or less, mixing dopamine (DA) of a preset amount into the solution and agitating the solution to coat the sponge with the dopamine, repeatedly cleaning the sponge coated with the dopamine, and then drying the sponge.

The may be is mixed in the solution in a preset range of 1 g/L or more and 16 g/L or less.

The absorbent belt may be lipophilic to absorb an oil within the cleaning liquid.

The driving portion may include an upper roller and a lower roller. A drive motor is mounted on at least one of the upper roller and the lower roller, to rotate the absorbent belt in a preset direction.

The upper roller may be connected to a height adjuster, to have a vertical position corresponding to a length of the absorbent belt.

The squeeze roller may include a first roller and a second roller that are mounted on the cradle, disposed at both sides of the absorbent belt, and configured to operate with each other in a horizontal direction.

In the squeeze roller, at least one of the first roller and the second roller may be operated to pressurize the absorbent belt interposed between the first and second rollers, to separate the oil absorbed in the absorbent belt.

The recollected oil holder may be mounted on the cradle, and may be configured such that the absorbent belt may pass through the recollected oil holder.

The recollected oil holder may be connected to an oil storage tank configured to receive and store the oil separated from the absorbent belt.

According to the absorbent belt and the oil skimmer including the same, the sponge nanocoated with the dopamine that selectively absorbs only oil is employed, the oil absorbed in the sponge may be discharged by the squeezing of the squeeze roller to be reused, and in addition, the recollected cleaning liquid may be promptly filtered to be reused.

In addition, the lifespan of the cleaning liquid may be improved, thereby reducing costs.

Other effects that may be obtained or are predicted by an exemplary embodiment will be explicitly or implicitly described in a detailed description of the present disclosure. That is, various effects that are predicted according to an exemplary embodiment will be described in the following detailed description.

DETAILED DESCRIPTION

Figure 1:
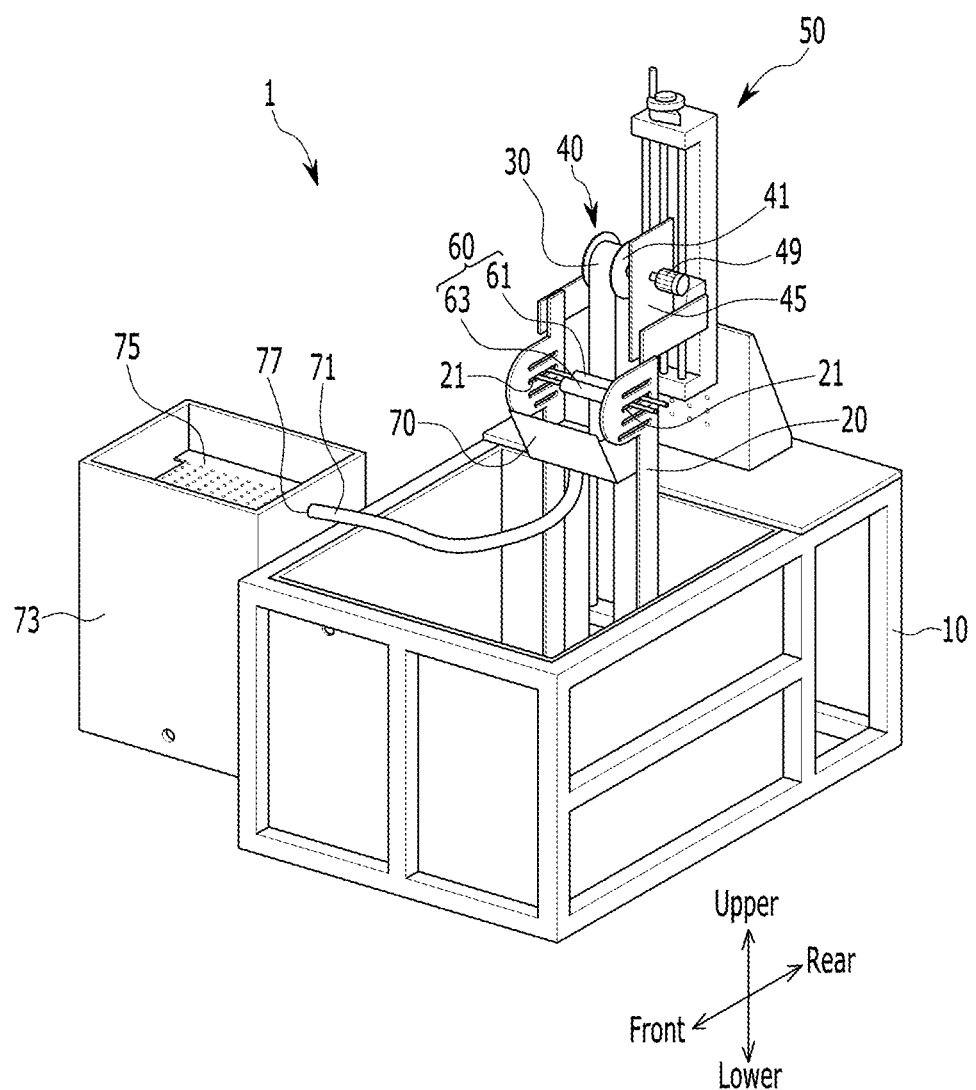
FIG. 1 is a schematic diagram of an oil skimmer according to an embodiment.

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

In order to clarify the present disclosure, parts that are not related to the description will be omitted, and the same elements or equivalents are referred to with the same reference numerals throughout the specification.

Also, the size and thickness of each element are arbitrarily shown in the drawings, but the present disclosure is not necessarily limited thereto, and in the drawings, the thickness of layers, films, panels, regions, etc., are exaggerated for clarity.

In addition, in the following description, dividing names of components into first, second, and the like is to divide the names because the names of the components are the same as each other and an order thereof is not particularly limited.

In addition, unless explicitly described to the contrary, the word "comprise" and variations such as "comprises" or "comprising", will be understood to imply the inclusion of stated elements but not the exclusion of any other elements.

Figure 2:
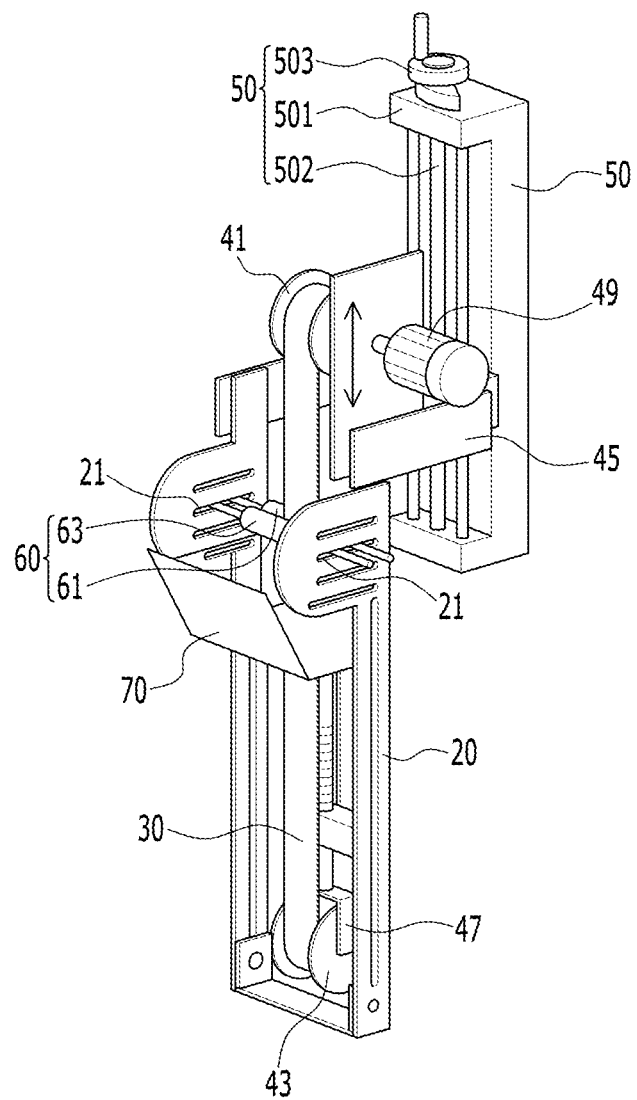
FIG. 2 is a schematic diagram of a part of an oil skimmer according to an embodiment.
Figure 3:
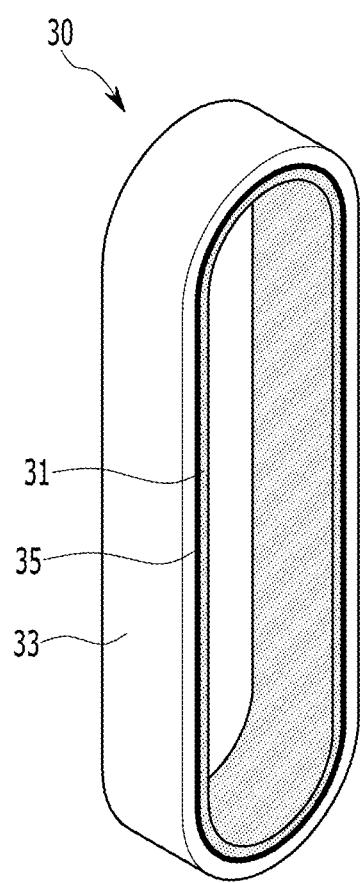
FIG. 3 is a schematic diagram of an absorbent belt applied to an oil skimmer according to an embodiment.
Figure 4:
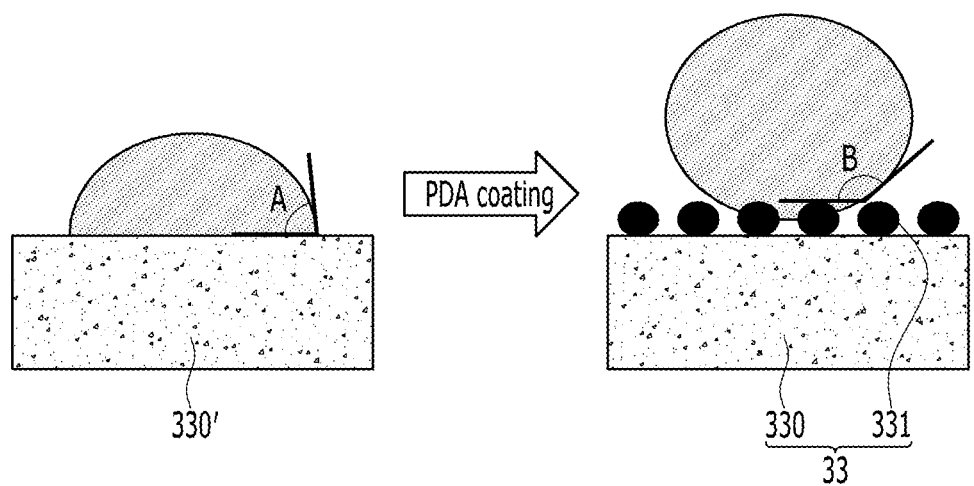
FIG. 4 illustrates an effect of an absorbent belt applied to an oil skimmer according to an embodiment.
Figure 5:
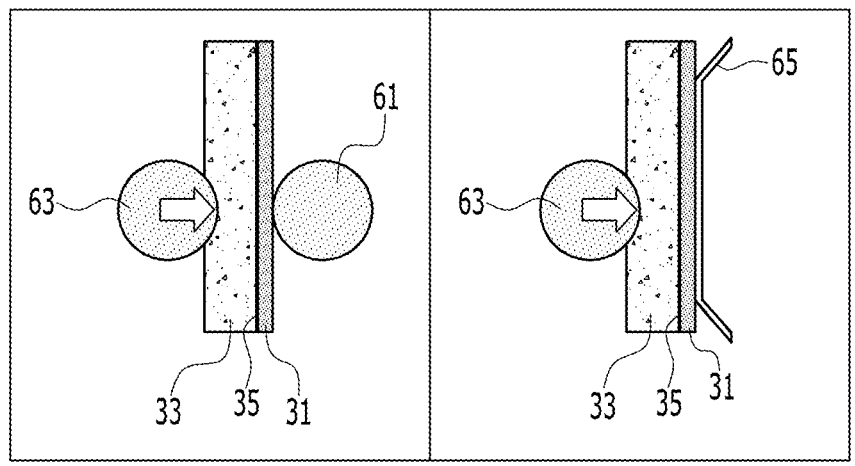
FIG. 5 is a schematic diagram of a squeeze roller applied to an oil skimmer according to an embodiment.

FIG. 1 is a schematic diagram of an oil skimmer according to an exemplary embodiment. FIG. 2 is a schematic diagram of a part of an oil skimmer according to an exemplary embodiment. FIG. 3 is a schematic diagram of an absorbent belt applied to an oil skimmer according to an exemplary embodiment. FIG. 4 illustrates an effect of an absorbent belt applied to an oil skimmer according to an exemplary embodiment. FIG. 5 is a schematic diagram of a squeeze roller applied to an oil skimmer according to an exemplary embodiment.

Impurities generated during metal processing for automobiles, for example, metal residues and oils, may cause contamination of water-soluble cleaning liquid in the cleaning process.

The cleaning liquid formed by chemical treatment with a preset amount of chemical in water.

An oil skimmer 1 according to an exemplary embodiment may be applied to filter and reuse the cleaning liquid.

For such a purpose, referring to FIG. 1 and FIG. 2, the oil skimmer 1 according to an exemplary embodiment includes a cleaning liquid storage tank 10, an absorbent belt 30, a driving portion 40, a squeeze roller 60, and a recollected oil holder 70.

In this specification, "upper portion", "upper end", or "upper surface" of a component indicates portion, end, or surface of the component that is relatively positioned higher in the drawing, and "lower portion", "lower end", or "lower surface" of a component indicates portion, end, or surface of the component that is relatively positioned lower in the drawing.

The present disclosure is described with reference directions illustrated in FIG. 1.

The cleaning liquid storage tank 10 is formed in a box shape with an open top. A cleaning liquid having been used in a vehicle processing line is stored in the cleaning liquid storage tank 10.

The absorbent belt 30 may be vertically disposed by a cradle 20 disposed inside the cleaning liquid storage tank 10. A preset range of a lower end portion of the absorbent belt 30 is immersed in the cleaning liquid. The absorbent belt 30 is configured to rotate, e.g., in one direction.

Referring to FIG. 3, the absorbent belt 30 may be coated with a composite material to absorb an oil contained in the cleaning liquid while rotating, thereby becoming lipophilic.

For example, the composite material may include dopamine (DA) 331.

The absorbent belt 30 may include a urethane belt 31 having a closed cross-section and a sponge member 33 coated with the composite material and adhered to an exterior surface of the urethane belt 31.

In the absorbent belt 30, the sponge member 33 may be bonded to the urethane belt 31 by an adhesive member 35.

At this time, the sponge member 33 may be formed by immersing a sponge 330 of a polyurethane material in a solution of pH 8 or more and pH 8.5 or less, mixing the dopamine 331 of a preset amount into the solution and agitating the solution to coat the sponge with the dopamine, repeatedly cleaning the sponge coated with the dopamine, and then drying the sponge.

The sponge 330 may include a polyurethane foam.

In addition, the dopamine 331 may be mixed in a solution in a preset range of 1 g/L or more and 16 g/L or less.

In the absorbent belt 30, the sponge 330 nanocoated with the dopamine 331 may be formed in a thickness in a range of 20 mm or more and 40 mm or less, and may be adhered to the urethane belt 31. As the thickness of the sponge member 33 increases, the amount of oil that may be absorbed increases.

Referring to FIG. 4, by applying the sponge member 33 in which the sponge 330 is coated with the dopamine 331, the absorbent belt 30 may have a nano-roughness on the sponge member 33.

By the nano-roughness formed by nanocoating the dopamine 331 on the surface of the sponge 330, water repellency and oil absorbing performance of an original sponge 330' may be increased.

That is, the dopamine 331 is nanocoated on the surface of the sponge 330 through inherent adherence, and thereby, a surface area of the sponge 330 is increased, thereby improving the water repellency.

Furthermore, a contact angle B of the sponge 330 coated with the dopamine 331 with respect to water becomes larger than a contact angle A of the original sponge 330' with respect to water.

That is, when the nano-roughness is formed on the surface of the sponge 330, it is possible to more easily absorb oil due to a change in the mechanism of absorbing oil.

Accordingly, the oil mixed in the cleaning liquid may be easily absorbed by the absorbent belt 30.

Referring back to FIG. 2, the driving portion 40 may be disposed at vertical both ends of the absorbent belt 30 and mounted on the cradle 20.

The driving portion 40 is rotated in a direction opposite to the operation direction of the absorbent belt 30.

The driving portion 40 includes an upper roller 41 and a lower roller 43.

The driving portion 40 may be fixed by an upper bracket 45 and a lower bracket 47.

At this time, the lower bracket 47 may be mounted on the cradle 20.

The driving portion 40 may include a drive motor 49 mounted on at least one of the upper roller 41 and the lower roller 43.

For example, the drive motor 49 may be connected to the upper roller 41.

The driving portion 40 rotates the absorbent belt 30 in a preset direction.

In addition, the upper roller 41 may be connected to a height adjuster 50.

In more detail, the upper roller 41 may be connected to the height adjuster 50 by the upper bracket 45.

By the height adjuster 50, the upper roller 41 may have a vertical position corresponding to a length of the absorbent belt 30.

In detail, the height adjuster 50 may include a body 501, a threaded bar 502 penetrating the body 501, and a handle 503 to rotate the threaded bar 502, and the upper bracket 45 may be thread-coupled with the threaded bar 502.

The height adjuster 50 may be configured on an upper surface of the cleaning liquid storage tank 10.

In addition, the squeeze roller 60 is disposed at a preset position with respect to the absorbent belt 30 and mounted on the cradle 20.

The squeeze roller 60 is configured to separate an oil absorbed in the absorbent belt 30 by squeezing the absorbent belt 30. The squeeze roller 60 includes a first roller 61 and a second roller 63. The first roller 61 and the second roller 63 may be disposed at both sides of the absorbent belt 30 and configured to operate with each other in a horizontal direction.

At this time, as shown in FIG. 5, in the squeeze roller 60, at least one of the first roller 61 and the second roller 63 may be operated to pressurize the absorbent belt 30 interposed between the first and second rollers 61 and 63, to separate the oil absorbed in the absorbent belt 30.

For example, the first roller 61 may be fixed, and the second roller 63 may be configured to approach and move away from the first roller 61.

Both ends of the squeeze roller 60 may be mounted in the slots 21 formed in the cradle 20.

As a variation, in the squeeze roller 60, the above-described fixed first roller 61 may be replaced with a plate member 65 (refer to FIG. 5).

The plate member 65 may be formed as an abrasive plate allowing sliding of the absorbent belt 30, and the second roller 63 may squeeze the absorbent belt 30 while plate member 65 supports the absorbent belt 30.

The recollected oil holder 70 is disposed below the squeeze roller 60.

The recollected oil holder 70 may be mounted on the cradle 20, and configured such that the absorbent belt 30 may pass through the recollected oil holder 70.

The recollected oil holder 70 is configured to allow penetration of the absorbent belt 30, and may be mounted on the cradle 20.

The recollected oil holder 70 is configured to store the oil separated from the absorbent belt 30.

The recollected oil holder 70 is connected to an oil storage tank 73 configured to receive and store the oil separated from the absorbent belt 30.

The oil storage tank 73 may be disposed adjacent to the cleaning liquid storage tank 10.

At this time, a connection pipe 71 for connection to the recollected oil holder 70 is installed in the oil storage tank 73.

The connection pipe 71 may be may be connected between a lower surface of the recollected oil holder 70 and a side upper portion of the oil storage tank 73.

The connection pipe 71 is connected to an inlet 77 in the oil storage tank 73.

In addition, a filter plate 75 is configured within the oil storage tank 73, in a position lower than the inlet 77.

Accordingly, an oil stored in the recollected oil holder 70 moves to the oil storage tank 73, and is stored in the oil storage tank 73 after being filtered by the filter plate 75.

The oil stored in the oil storage tank 73 may be reused.

Therefore, according to an absorbent belt and an oil skimmer including the same according to an exemplary embodiment, by applying a lipophilic absorbent belt, the oil in water-soluble cleaning liquid may be selectively separated, thereby improving the performance of separating oil from the used cleaning liquid.

That is, according to the absorbent belt and the oil skimmer including the same, the sponge 330 nanocoated with the dopamine 331 that selectively absorbs only oil is employed, the oil absorbed in the sponge 330 may be discharged by the squeezing of the squeeze roller 60 to be reused, and in addition, the recollected cleaning liquid may be promptly filtered to be reused.

As a result, the lifespan of the cleaning liquid may be improved, thereby reducing costs.

In addition, an absorbent belt and an oil skimmer including the same according to an exemplary embodiment may be applied to rapidly absorb oil captured by a barrier formed on the water surface in the event of a marine oil spill.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

The invention claimed is:

1. An oil skimmer, comprising:
   a cleaning liquid storage tank configured to store a cleaning liquid having been used in a vehicle processing line;
   an absorbent belt disposed by a cradle disposed in the cleaning liquid storage tank, of which a preset range of a lower end portion is immersed inside the cleaning liquid, and coated with a composite material to absorb an oil contained in the cleaning liquid while rotating;
   a driving portion disposed vertically at both ends of the absorbent belt and mounted on the cradle;
   a squeeze roller disposed at a preset position with respect to the absorbent belt, mounted on the cradle, and configured to separate an oil absorbed in the absorbent belt by squeezing the absorbent belt; and
   a recollected oil holder disposed below the squeeze roller and configured to store the oil separated from the absorbent belt.

2. The oil skimmer of claim 1, wherein the absorbent belt comprises:
   an endless urethane belt having a closed cross-section; and
   a sponge member coated with the composite material and adhered to an exterior surface of an urethane belt by an adhesive member.

3. The oil skimmer of claim 2, wherein the sponge member is formed by immersing a sponge of a polyurethane material in a solution of pH 8 or more and pH 8.5 or less, mixing dopamine (DA) of a preset amount into the solution and agitating the solution to coat the sponge with the dopamine, repeatedly cleaning the sponge coated with the dopamine, and then drying the sponge.

4. The oil skimmer of claim 3, wherein the dopamine is mixed in the solution in a preset range of 1 g/L or more and 16 g/L or less.

5. The oil skimmer of claim 4, wherein the absorbent belt is lipophilic to absorb an oil within the cleaning liquid.

6. The oil skimmer of claim 1, wherein:
   the driving portion comprises an upper roller and a lower roller; and
   a drive motor is mounted on at least one of the upper roller and the lower roller, the drive motor being configured to rotate the absorbent belt in a preset direction.

7. The oil skimmer of claim 6, wherein the upper roller is connected to a height adjuster, and wherein the upper roller has a vertical position corresponding to a length of the absorbent belt.

8. The oil skimmer of claim 1, wherein the squeeze roller comprises a first roller and a second roller that are mounted on the cradle, disposed at both sides of the absorbent belt, and configured to operate with each other in a horizontal direction.

9. The oil skimmer of claim 8, wherein, in the squeeze roller, at least one of the first roller and the second roller is operated to pressurize the absorbent belt interposed between the first and second rollers, to separate the oil absorbed in the absorbent belt.

10. The oil skimmer of claim 1, wherein the recollected oil holder is mounted on the cradle, and is configured such that the absorbent belt may pass through the recollected oil holder.

11. The oil skimmer of claim 1, wherein the recollected oil holder is connected to an oil storage tank configured to receive and store the oil separated from the absorbent belt.

* * * * *